United States Patent
Cho

(10) Patent No.: US 7,411,372 B2
(45) Date of Patent: Aug. 12, 2008

(54) DIGITAL DEVICE WITH RECHARGEABLE BATTERY AND RECHARGING METHOD THEREOF

(75) Inventor: Sung-Mun Cho, Gyunggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 380 days.

(21) Appl. No.: 10/713,353

(22) Filed: Nov. 17, 2003

(65) Prior Publication Data

US 2004/0130293 A1    Jul. 8, 2004

(30) Foreign Application Priority Data

Jan. 2, 2003   (KR) ............... 10-2003-0000112

(51) Int. Cl.
*H01M 10/46* (2006.01)
(52) U.S. Cl. ..................................... 320/141
(58) Field of Classification Search ............... 320/139, 320/141–142, 145, 152, 160, 163
See application file for complete search history.

(56) References Cited

U.S. PATENT DOCUMENTS

| | | | |
|---|---|---|---|
| 5,225,763 A | | 7/1993 | Krohn et al. |
| 5,304,916 A | | 4/1994 | Le et al. |
| 5,325,040 A | | 6/1994 | Bogut et al. |
| 5,545,969 A | * | 8/1996 | Hasegawa .................. 320/149 |
| 5,723,970 A | | 3/1998 | Bell et al. |
| 5,739,667 A | * | 4/1998 | Matsuda et al. ............. 320/161 |
| 5,777,399 A | | 7/1998 | Shibuya |
| 5,847,546 A | | 12/1998 | Sengupta et al. |
| 5,900,717 A | * | 5/1999 | Lee ........................... 320/150 |
| 6,118,250 A | * | 9/2000 | Hutchison et al. ........... 320/160 |
| 6,127,809 A | | 10/2000 | Kates et al. |
| 6,229,286 B1 | | 5/2001 | Tokuyama |
| 6,300,744 B1 | | 10/2001 | Shum |
| 6,326,771 B1 | | 12/2001 | Popescu-Stanesti |
| 6,429,625 B1 | * | 8/2002 | LeFevre et al. ............. 320/155 |

FOREIGN PATENT DOCUMENTS

EP    1 043 824        10/2000
EP    1 043 824 A2    10/2000

OTHER PUBLICATIONS

Fundamentals of Power Electronics, 2$^{nd}$ edition. Robert W, Erickson and Dragan Maksimovic. Kluwer Academic Publishers, 2003.*
European Search Report dated Jan. 31, 2006 based on application EP 03 25 7656.

* cited by examiner

*Primary Examiner*—Edward Tso
(74) *Attorney, Agent, or Firm*—Roylance, Abrams, Berdo & Goodman, L.L.P.

(57) ABSTRACT

A digital device capable of recharging a rechargeable battery, comprising a consuming current detect unit for detecting a consuming current input to the digital device through an adapter, a control unit, a recharging current detect control unit for detecting the battery recharging current as the battery is recharged, and a recharging control unit for regulating the consuming current to the rechargeable battery in proportion to a pulse width modulation control signal output from the control unit and the battery recharging current detected by the recharging current detect control unit.

34 Claims, 5 Drawing Sheets

US 7,411,372 B2

DIGITAL DEVICE WITH RECHARGEABLE BATTERY AND RECHARGING METHOD THEREOF

CROSS REFERENCE TO RELATED APPLICATIONS

This application claims benefit under 35 U.S.C. §119 from Korean Patent Application No. 2003-112, filed Jan. 2, 2003 in the Korean Intellectual Property Office, the disclosure of which is incorporated herein by reference.

BACKGROUND OF THE INVENTION

1. Field of the Invention

The present invention relates to a digital device with a rechargeable battery, and more specifically, to a digital device and a method thereof that enables the digital device not only to be operated using a power supply from an adapter, but also to simultaneously recharge a battery.

2. Description of the Related Art

Generally, a conventional portable digital device, such as a handheld PC, is designed to be supplied with power from a battery therein, generally a rechargeable battery, for operating the device, as it is moved about. After the battery is discharged, the device can be operated again by recharging the battery through an adapter for a predetermined time.

However, in the above referenced conventional portable digital device with the rechargeable battery, there is a problem in that the mode of the device should be converted to a recharge mode for recharging the battery when the digital device is supplied with power through the adapter. In addition, there is another problem in that an expensive integrated circuit (IC) is required to separately control battery recharging, and this increases production costs.

There is still another problem in the display means of the conventional portable digital device having the recharge and discharge function. The conventional portable digital device has such a simple display means for displaying the state of recharge or discharge, that it cannot display the various states of the digital device to a user as they occur during the recharge and discharge of the battery.

SUMMARY OF THE INVENTION

In an effort to solve the problems as described above, it is an object of the present invention to provide an inexpensive battery re-charger with a small number of components.

In another aspect, the present invention includes a digital device capable of recharging a rechargeable battery, comprising a consuming current detect unit for detecting a consuming current input to the digital device through an adapter, a control unit, a recharging current detect unit for detecting the battery recharging current as the battery is recharged, and a recharging control unit for regulating the consuming current to the rechargeable battery in proportion to a control signal, such as a pulse width modulation control signal, output from the control unit and the battery recharging current detected by the recharging current detect control unit.

In yet another aspect of the present invention provides a method for controlling recharging current of a rechargeable battery comprising determining whether power is supplied through an adapter, and if so, detecting a consuming current to the rechargeable battery, outputting a signal, in particular, a pulse width modulation control signal, according to a magnitude of the consuming current to the rechargeable battery and detecting a consuming current and battery recharging current. The method further includes outputting the pulse width modulation control signal according to the detected consuming current which supplies a battery recharging current, detecting continuously the consuming current and battery recharging current and adjusting and outputting the pulse width modulation control signal according to the magnitude of the detecting consuming current which supplies a battery recharging current. The method for controlling recharging current of a rechargeable battery also includes determining whether the recharging current equals a setup current, and if not, proceeding to detect the consuming current and battery recharging current and adjusting and outputting a duty cycle of a pulse width modulation control signal, and displaying a recharging complete message if the recharging current does not equal the setup current.

Still another aspect of the present invention provides a method for recharging a rechargeable battery by determining whether the rechargeable battery voltage is greater than 5 volts, and if so, determining that the battery is partially discharged and performing a recharge operation according to the state of a digital device being used. Further, if the method determines that the battery voltage is less than or equal to 5 volts, the method charges the battery for approximately 2 seconds at about 80 milliamps, otherwise it performs a quick recharge, or a trickle recharge.

BRIEF DESCRIPTION OF THE DRAWINGS

The above-mentioned objects and the feature of the present invention will be more apparent from the following description of the preferred embodiment of the present invention when read in connection with the appended drawings, in which.

DETAILED DESCRIPTION OF THE PREFERRED EMBODIMENT

Figure 1:
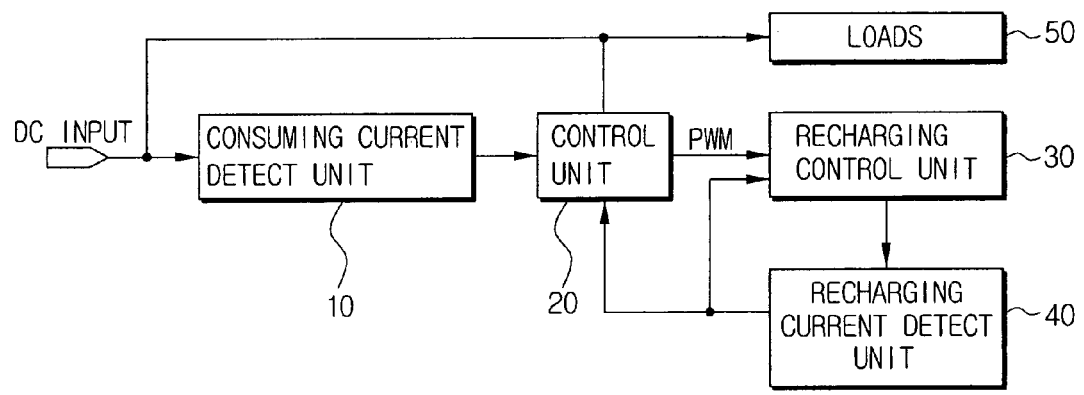
FIG. 1 is a block diagram of a digital device capable of recharging a battery according to a preferred embodiment of the present invention.

FIG. 1 is a block diagram schematically showing a battery charging unit 100 for a digital device capable of recharging a rechargeable battery according to a preferred embodiment of the present invention. The battery charging unit 100 comprises a consuming current detect unit 10, a control unit 20, a recharging control unit 30, a recharging current detect unit 40, and respective loads 50 of the digital device to perform basic operations.

The consuming current detect unit 10 detects a consuming current input to the digital device through an adapter.

The recharging current detect unit 40 detects the battery recharging current as the battery is recharged.

The recharging control unit 30 regulates the consuming current to the rechargeable battery (battery) 60 (not shown) in proportion to a pulse width modulation (PWM) control signal output from the control unit 20 and the battery recharging current detected by the recharging current detect unit 40.

The control unit 20 outputs the PWM control signal to the recharging control unit 30. The PWM control signal has a duty cycle adjusted according to the consuming current detected by the consuming current detect unit 10.

Figure 2:
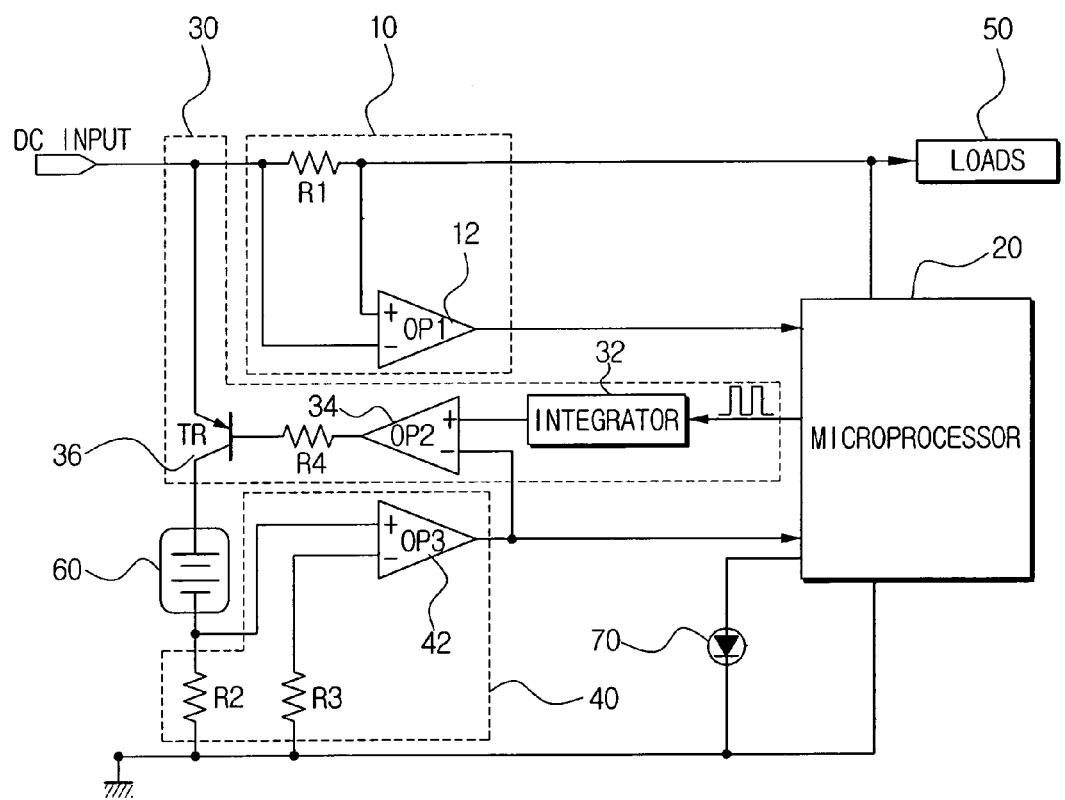
FIG. 2 is a circuit diagram showing in detail the digital device of FIG. 1.

FIG. 2 is a circuit diagram showing in detail the battery charging unit 100 of FIG. 1. In FIG. 2, each of the boxes enclosed by dotted lines indicates respectively the function blocks in FIG. 1.

The consuming current detect unit 10 comprises a current detecting resistor R1 for detecting the consuming current, and a first operational amplifier 12 for amplifying the consuming current detected by the current detecting resistor R1. The signals from the both ends of the current detecting resistor R1 are input respectively to a noninverting terminal (+) and an inverting terminal (−) of the first operational amplifier 12, and then are amplified.

The recharging current detect unit 40 includes two current detecting resistors R2 and R3 for detecting the battery recharging current, and a third operational amplifier 42 for amplifying the battery recharging current detected by the current detecting resistors R2, R3. The third operational amplifier 42 compares and amplifies the signal detected by the current detecting resistor R2 that is connected between the battery 60 and ground, and the signal detected by the current detecting resistor R3. Herein, the former signal is input to the noninverting terminal and the latter signal is input to the inverting terminal of the third operational amplifier 42.

The recharging control unit 30 comprises an integrator 32 for smoothing the PWM control signal, a switching control portion 34 for outputting a switching control signal by comparing the output signal from the integrator 32 with the battery recharging current, and a switching portion 36 for switching the received consuming current and transmitting it to the battery 60 according to the switching control signal output from the switching control portion 34. The switching control portion 34 comprises a second operational amplifier 34 for amplifying signals, in which the non-inverting terminal is connected to the converted DC signal of the PWM control signal output from the integrator 32, and the inverting terminal is connected to the battery recharging current detected by the recharging current detect unit 40 (i.e., the output of the third operational amplifier 42). In addition, the switching portion 36 comprises a transistor (TR) to respond to the output signal from the second operational amplifier 34.

The battery charging unit 100 further includes a display means 70 for displaying the recharging state of the battery 60. As the display means 70, a light emitting diode (LED) 70 can be used. Other display devices, well known to those skilled in the art, can also be used as display means 70.

The microprocessor 20 controls the overall operations of the battery charging unit 100, and specifically, the microprocessor 20 outputs the PWM control signal to the integrator 32 so as to control the recharge of the battery 60 according to the consuming current, and operates the LED 70 according to the recharging state of the battery 60.

Figure 3:
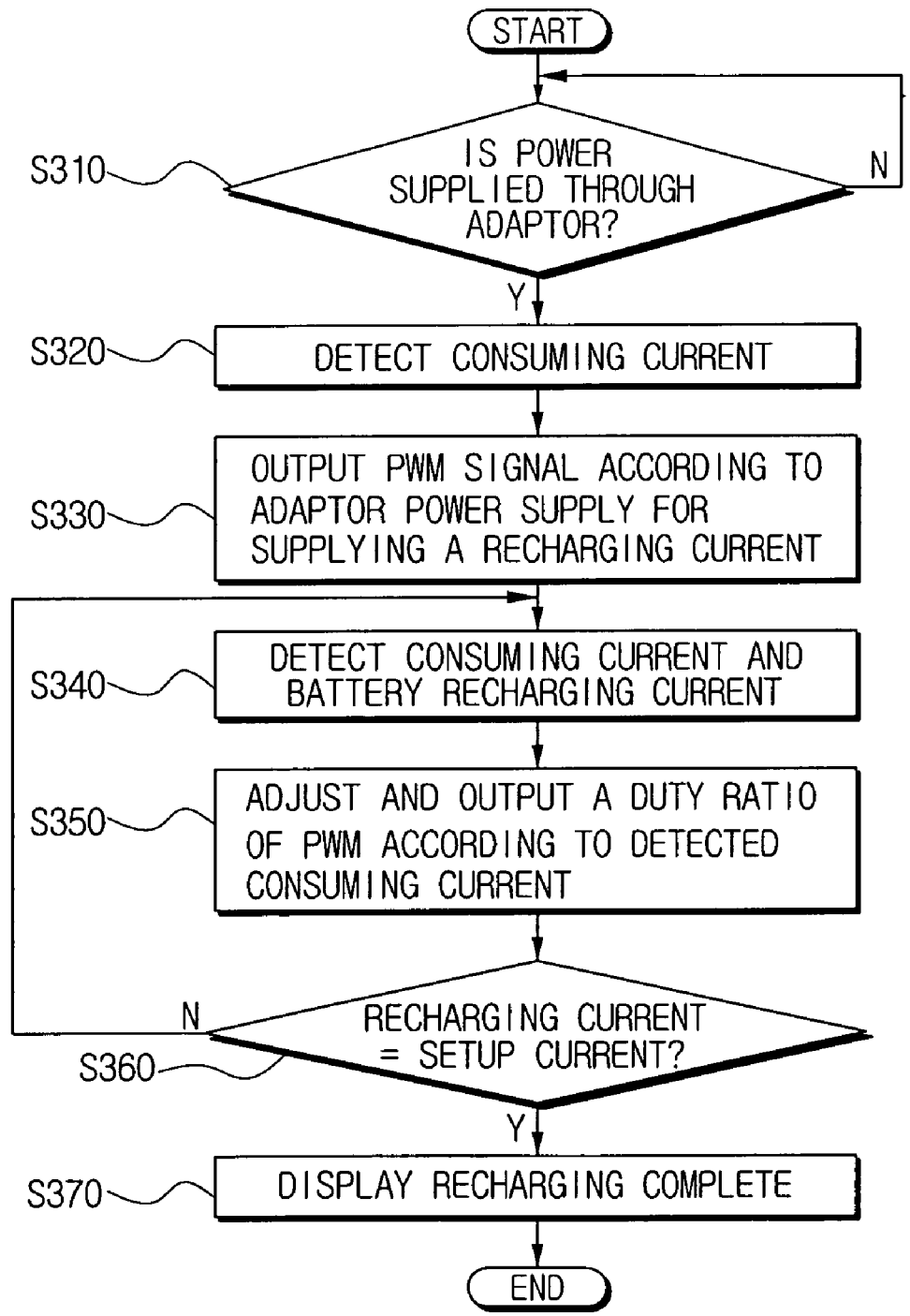
FIG. 3 is a flowchart illustrating a method for controlling a pulse width modulator by the microprocessor of FIG. 2 according to the preferred embodiment of the invention.
Figure 5:
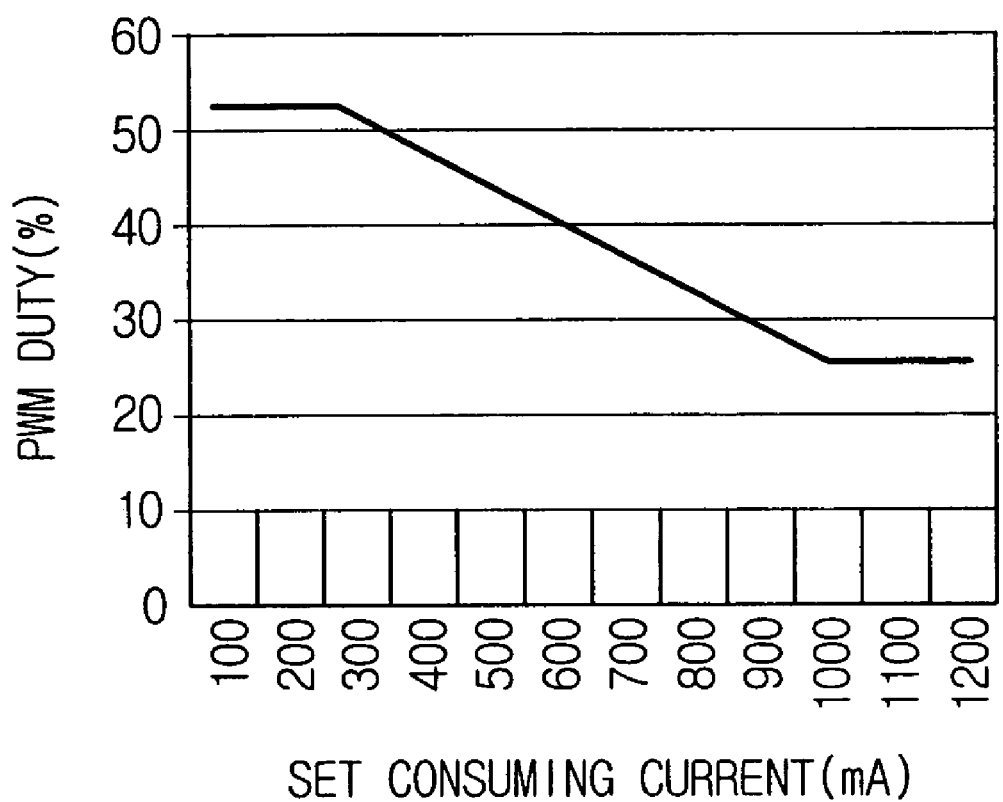
FIG. 5 is a graph showing the change of a duty cycle of a PWM signal in the microprocessor according to the variation of the consuming current.

FIG. 3 is a flowchart for illustrating in detail the process of the microprocessor in FIGS 1, 2. If DC power is supplied from the adapter (S310), the microprocessor 20 first detects the consuming current by means of the output signal from the first operational amplifier 12 that amplifies the signals of the both ends of the current detecting resistor R1 (S320). With the consuming current detected, the microprocessor 20 outputs the PWM control signal to the recharging control unit 30 in accordance with the consuming current so that the recharging current is supplied to the battery 60 (S330). The integrator 32, located within the recharging control unit 30, smoothes and receives the PWM control signal and outputs a DC signal to the second operational amplifier 34. The second operational amplifier 34 transmits the signal reduced through the resistor R4 to the base of the transistor TR, and then the transistor TR switches the consuming current that is applied from the adapter, to the battery 60 according to the DC signal output from the integrator 32. The transistor TR is turned on according to the magnitude of the initial consuming current, as the consuming current increases/decreases (step S340), the microprocessor 20 again outputs (continuously) the PWM signal, but the duty cycle is varied according to the increase/decrease of the detected consuming current (S350). FIG. 5 shows the change of the PWM signal duty cycle output from the microprocessor 20 as the consuming current increases/decreases. When the microprocessor 20 transmits the PWM control signal with the changed duty cycle, the transistor TR switches the consuming current to the battery 60, in the amount adjusted in proportion to the changed duty cycle of the PWM control signal.

Therefore, as the consuming current is supplied to the battery 60, battery recharging is performed. Concurrently, the microprocessor 20 detects the battery recharging current while the battery 60 is recharged, using the current detecting resistor R2, R3 and the third operational amplifier 42 (S340). The signal that represents the comparison between the battery recharging current and the current detected by current detecting resister R3 is input to the inverting terminal (−) of the second operational amplifier 34 to be used for switching control, along with the DC signal which is output from the integrator 32. The microprocessor 20 is able to recognize the battery recharging capacity according to the battery recharging current as detected. Accordingly, when the detected battery recharging current reaches a predetermined current level ("Yes" path from decision step S360), the microprocessor 20 displays a message through the LED 70 (S370) that battery recharging complete. If, however, the recharging current does not equal the setup current, the method returns to continuously detecting the consuming current and battery recharging current step in step S340 ("No" path from decision step S360).

Figure 4:
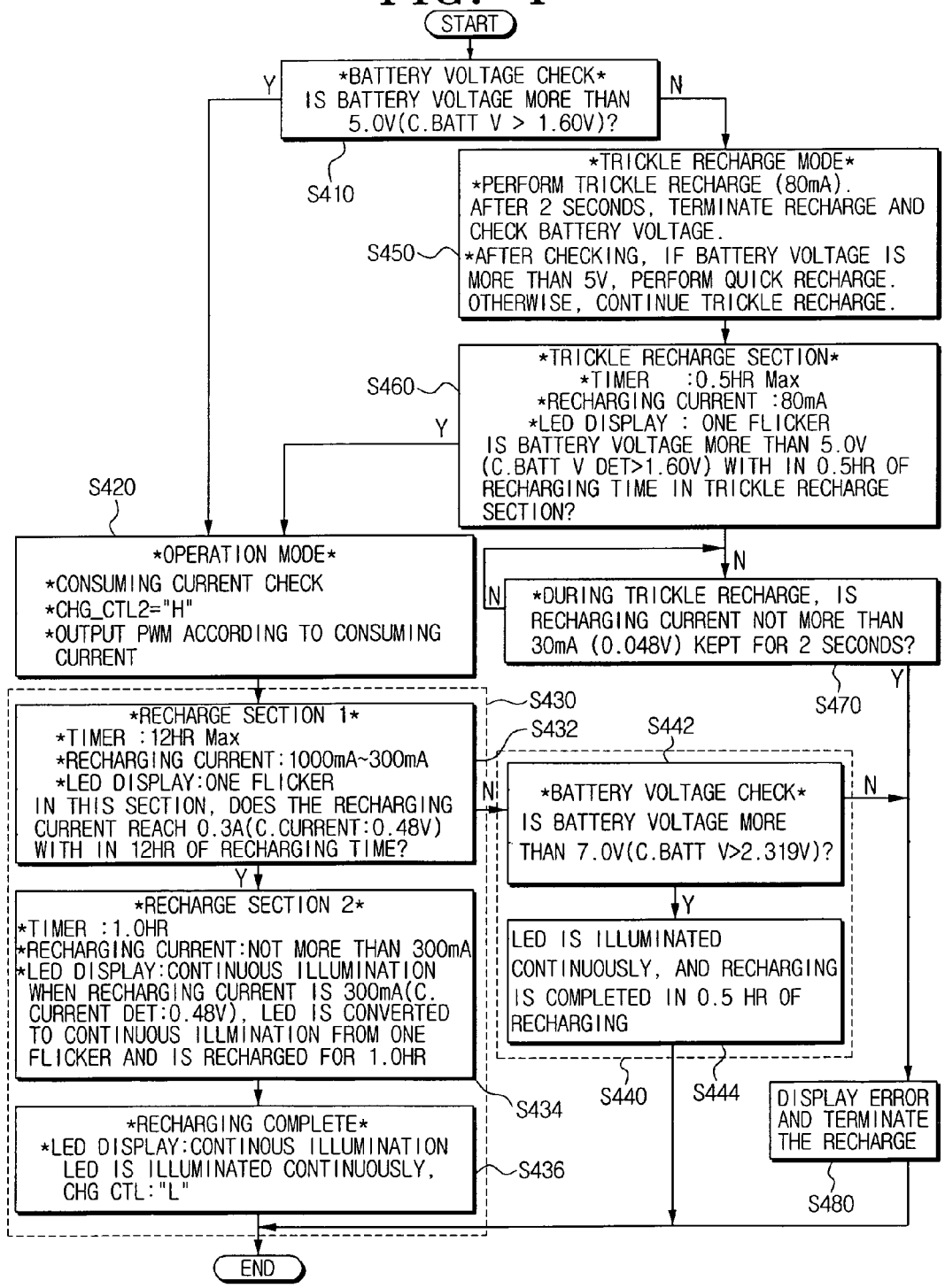
FIG. 4 is a flowchart illustrating a method of recharging the battery in the digital device according to the preferred embodiment of the present invention.

FIG. 4 is a flowchart for showing the preferred embodiment of a method of recharging the battery 60 with battery charging unit 100 according to an embodiment of the present invention. If the voltage of the battery 60 is more than 5V ("Yes" path from decision step S410), the microprocessor 20 determines that the battery 60 is partially discharged, and performs the recharge operation according to the state of the digital device being used. To perform the recharge operation according to the state of the digital device, the microprocessor 20 checks the consuming current, and outputs a PWM control signal according to the consuming current (S420). Next, a portion of the consuming current according to the PWM control signal is supplied to the battery 60 for recharging (S430). Note that step S430 comprises steps S432, S434 and S436. After outputting the PWM control signal in step S420, the microprocessor 20 determines if the battery recharging current is between 1000 mA~300 mA in decision step S432. If it is, the microprocessor 20 flickers the LED 70 one time.

If the recharging current reaches 0.3 A within 12 hours, which is a predetermined maximum recharge time, the microprocessor 20 switches to a second recharge mode ("Yes" path from decision step S432) in step S434. In step S434 the LED 70 is illuminated continuously, and after one hour of recharging the battery 60, a "recharging complete" message is displayed (S436). When recharging is completed, the LED 70 is illuminated continuously. In the event that the recharging current does not reach 0.3 A within 12 hours ("No" path from decision step S432), the battery voltage is checked by the microprocessor 20 (S442). If the battery voltage is more than 7.0V ("Yes" path from decision step S442), the LED 70 is continuously illuminated, and recharging is completed after half an hour of recharging (S444). However, if the battery voltage is not more than 7.0V ("No" path from decision step S442), an error message is displayed and the recharging operation is terminated (S480).

Referring back to decision step S410, if the battery voltage is less than or equal to 5V, the microprocessor 20 performs a trickle recharge mode (S450). In a trickle recharge mode, the microprocessor 20 supplies 80 mA to the battery 60 for half an hour regardless of the operation of the digital device. If the battery voltage is more than 5V after 2 seconds of the trickle recharge, a quick recharge is performed. Otherwise, the trickle recharge is continued. When the TRICKLE recharge begins (decision step S460), the microprocessor 20 flickers the LED 70. If after one half hour of trickle recharge the battery voltage is more than 5V step S420 is performed by the microprocessor 20 ("Yes" path from decision step S460). If the battery voltage is less than or equal to 5V after one half hour of trickle recharge, the method proceeds to decision step S470. In decision step S470, it is determined whether the recharging current is not more than 30 mA for two seconds during the trickle recharge. If the recharging current is not more than 30 mA for 2 seconds ("Yes" path from decision step S470), an error message is displayed and the recharging operation is terminated (S480). If, however, during trickle recharge the recharging current is more than 30 mA, or, it is less than 30 mA, but also for less than 2 seconds, the method continues to recheck the trickle recharge current magnitude and duration in decision step S470.

The method discussed above for battery recharging of the digital device divides the battery recharge modes into two modes according to the battery residual capacity; an operation mode and a trickle mode. If the battery residual capacity is greater than a specific criteria, the operation of the digital device and the recharging thereof are performed simultaneously. Otherwise, the battery 60 is first recharged to exceed the criteria, and then, the operation of the digital device and recharging thereof are performed simultaneously.

The above-described embodiments do not limit the variation on the number of LEDs 70, the number of times of illuminating and flickering, and setup time that can be implemented in the battery charging unit 100. Therefore, a plurality of the LEDs 70 can be applied for displaying the recharging state of the battery 60, and it is possible to apply a different number of times of flickering the LED 70, as well as a different setup time. In addition various states can be displayed through the LED 70, such as errors occurring during the battery recharging caused by overcurrent, overvoltage, battery defective, and suspension of recharging.

The battery charging unit 100 can operate and recharge the battery 60 simultaneously with the power supplied from the adapter. Embodiments of the present invention can reduce the material costs as well as the number of parts, since the control unit controls the recharging operation instead of the high-priced IC.

In addition, since the control unit 20 controls the recharging operation, errors such as overcurrent, overvoltage, battery-defective, suspension, as well as completion of recharging, are freely displayed on the display means. Therefore, users can recognize the recharging state of the battery 60 easily and conveniently.

While the invention has been shown and described with reference to a preferred embodiment thereof, it will be understood by those skilled in the art that various changes in form and details may be made therein without departing from the spirit and scope of the invention as defined by the appended claims.

What is claimed is:

1. A digital device capable of recharging a rechargeable battery comprising:
   a consuming current detect unit for detecting a consuming current input to the digital device;
   a control unit for generating a control signal based on the consuming current and a battery recharging current;
   a recharging current detect unit for detecting the battery recharging current as the battery is recharged; and
   a recharging control unit for regulating the current to the rechargeable battery in proportion to the control signal output from the control unit and the battery recharging current detected by the recharging current detect unit.

2. The digital device capable of recharging a rechargeable battery according to claim 1, wherein the control signal includes a pulse width modulation signal.

3. The digital device capable of recharging a rechargeable battery according to claim 2, wherein the pulse width modulation control signal has a duty ratio adjusted according to the consuming current detected by the consuming current detect unit.

4. The digital device capable of recharging a rechargeable battery according to claim 1, wherein the consuming current detect unit comprises:
   a first current detecting resistor for detecting the consuming current; and
   a first operational amplifier, wherein a first end of the first current detecting resistor is coupled to an inverting input of the first operational amplifier and the second end of the first current detecting resistor is coupled to the non-inverting input of the first operational amplifier.

5. The digital device capable of recharging a rechargeable battery according to claim 1, wherein the recharging current detect unit comprises:
   a second current detecting resistor;
   a third current detecting resistor for detecting the rechargeable battery recharging current; and
   a second operational amplifier, wherein a first end of the second current detecting resistor is coupled to a non-inverting input of the second operational amplifier and to the negative terminal of the rechargeable battery, and a first end of the third current detecting resistor is coupled to an inverting input of the second operational amplifier, and further wherein the second end of the second and third current detecting resistors are coupled together to earth ground.

6. The digital device capable of recharging a rechargeable battery according to claim 1, wherein the recharging control unit comprises:
   an integrator, an input of which is coupled to a first output of the control unit;
   a third operational amplifier;
   a fourth current detecting resistor; and
   a transistor, wherein a first output of the integrator is coupled to a non-inverting input of the third operational amplifier, an inverting input of the third operational amplifier is coupled to an output of the recharging current detect unit, a first end of the fourth current detecting resistor is coupled to an output of the third operational amplifier and a second end of the fourth current detecting resistor is coupled to a first input of the transistor, a second input of the transistor is coupled to a power source, and an output of the transistor is coupled to a positive terminal of the rechargeable battery.

7. The digital device capable of recharging a rechargeable battery according to claim 1, wherein the control unit includes a microprocessor.

8. A method for controlling recharging current of a rechargeable battery used in a digital device comprising:
   detecting a consuming current input to the digital device;
   detecting a battery recharging current as the battery is recharged;
   generating a control signal based on said detected consuming current and said detected battery recharging current; and
   regulating the recharging current to the rechargeable battery in proportion to the control signal and the detected battery recharging current.

9. The method for controlling recharging current of a rechargeable battery according to claim 8, wherein the control signal is a pulse width modulation signal.

10. The method for controlling recharging current of a rechargeable battery according to claim 8 further comprising:
    adjusting the control signal according to the detected consuming current.

11. The method for controlling recharging current of a rechargeable battery according to claim 8, further comprising:
    displaying a recharging complete message if the recharging current equals a predetermined value.

12. The method for controlling recharging current of a rechargeable battery according to claim 10, wherein the step of adjusting the control signal according to the detected consuming current comprises:
    determining whether the magnitude of the consuming current increases or decreases; and
    varying the control signal in accordance with the increase or decrease of the magnitude of the consuming current.

13. The method for controlling recharging current of a rechargeable battery according to claim 9, further comprising:
    outputting the control signal according to a magnitude of the consuming current.

14. The method for controlling recharging current of a rechargeable battery according to claim 13, wherein the step of outputting the control signal according to a magnitude of the consuming current comprises:
    maintaining the pulse width modulation duty cycle substantially at a first constant for a first range of consuming current values;
    maintaining the pulse width modulation duty cycle substantially at a second constant for a second range of consuming current values; and
    varying the pulse width modulation duty cycle linearly from about the first constant to about the second constant, for a third range of consuming current values.

15. The method for controlling recharging current of a rechargeable battery according to claim 14, wherein the first constant is in the range of about 50 to about 60 percent duty cycle.

16. The method for controlling recharging current of a rechargeable battery according to claim 14, wherein the second constant is in the range of about 20 to about 30 percent duty cycle.

17. The method for controlling recharging current of a rechargeable battery according to claim 14, wherein the first range of consuming current values is in the range of at or about 0 milliamps to at or about 275 milliamps.

18. The method for controlling recharging current of a rechargeable battery according to claim 14, wherein the second range of consuming current values is in the range of about 950 milliamps to about 1200 milliamps.

19. The method for controlling recharging current of a rechargeable battery according to claim 14, wherein the third range of consuming current values is in the range of about 275 milliamps to about 950 milliamps.

20. A method for recharging a rechargeable battery in a digital device comprising:
    determining whether a voltage of the rechargeable battery is greater than 5 volts, and if so, determining that the battery is partially discharged and performing a recharge operation according to a state of the digital device being used;
    wherein performing a recharge operation according to the state of the digital device being used comprises:
      determining a consuming current;
      outputting a pulse width modulation control signal according to a magnitude of the consuming current; and
      supplying a recharging current according to the pulse width modulation control signal to the rechargeable battery for recharging.

21. The method according to claim 20 wherein the step of performing a recharge operation according to a state of the digital device being used comprises:
    determining a consuming current;
    outputting a control signal according to the consuming current; and
    supplying a recharging current according to the control signal to the rechargeable battery for recharging.

22. The method according to claim 21 wherein the control signal includes a pulse width modulation signal.

23. The method according to claim 22 wherein the step of supplying a recharging current according to the pulse width modulation control signal to the rechargeable battery comprises:
    determining whether the recharging current is between approximately 1000 and 300 milliamps, and if so, illuminating an illumination device at least one time; and
    determining if the recharging current reaches 300 milliamps within 12 hours, and if so, switching to a second recharge mode.

24. The method according to claim 23 wherein the step of switching to a second recharge mode comprises:
    charging the rechargeable battery for a first time period of substantially one hour at a recharging current of less than or equal to 300 milliamps and illuminating the illumination device for substantially one hour; and
    illuminating the illumination device continuously after the first time period has elapsed.

25. The method according to claim 21, further comprising:
    determining that the recharging current does not reach 300 milliamps within 12 hours, and checking the battery voltage; and
    determining whether the voltage of the rechargeable battery is greater than 7 volts, and if so, illuminating an illumination device continuously.

26. The method according to claim 25, further comprising:
    determining that the voltage of the rechargeable battery is less than or equal to 7 volts; and
    displaying an error message and terminating the recharge.

27. The method according to claim 20, further comprising:
    determining that the voltage of the rechargeable battery is less than or equal to 5 volts;

supplying a recharge current to the battery for approximately 2 seconds at about 80 milliamps; and determining whether the voltage of the rechargeable battery is more than 5 volts, and if so, performing a quick recharge, otherwise performing a trickle recharge.

28. The method according to claim 27, wherein performing the trickle recharge comprises:

supplying approximately 80 milliamps to the battery for approximately one-half hour and illuminating an illumination device momentarily; and determining whether the voltage of the rechargeable battery is greater than approximately 5 volts after the approximately one half hour of recharging, and if so, performing a recharge operation according to the state of the digital device being used.

29. The method according to claim 20 wherein the step of supplying a recharging current according to the pulse width modulation control signal to the rechargeable battery comprises:

determining whether the recharging current is between approximately 1000 and 300 milliamps, and if so, illuminating an illumination device at least one time; and determining if the recharging current reaches 300 milliamps within 12 hours, and if so, switching to a second recharge mode.

30. The method according to claim 29 wherein the step of switching to a second recharge mode comprises:

charging the rechargeable battery for a first time period of substantially one hour at a recharging current of less than or equal to 300 milliamps and illuminating the illumination device for substantially one hour; and illuminating the illumination device continuously after the first time period has elapsed.

31. The method according to claim 28, further comprising:

determining that the recharging current does not reach 300 milliamps within 12 hours, and checking the voltage of the rechargeable battery; and determining whether the voltage of the rechargeable battery is greater than 7 volts, and if so, illuminating an illumination device continuously.

32. The method according to claim 31, further comprising:

determining that the voltage of the rechargeable battery is less than or equal to 7 volts; and displaying an error message and terminating the recharge.

33. The method according to claim 27, further comprising:

determining that the voltage of the rechargeable battery is less than or equal to approximately 5 volts within approximately one half hour; and determining whether the recharge current is not more than approximately 30 milliamps for approximately 2 seconds, and if not, continuing to recheck the magnitude and duration of the trickle recharge and if so, displaying an error message and terminating the recharge.

34. The method according to claim 12 wherein the control signal is a pulse width modulation signal and the step of varying the control signal comprises varying the duty cycle of the pulse width modulation signal.

* * * * *